W. E. COTTREL.
HOG FEEDER.
APPLICATION FILED DEC. 16, 1919.

1,358,525. Patented Nov. 9, 1920.

Witnesses:

Inventor
William E. Cottrel.

UNITED STATES PATENT OFFICE.

WILLIAM E. COTTREL, OF PEMBERTON, OHIO.

HOG-FEEDER.

1,358,525.  Specification of Letters Patent.  Patented Nov. 9, 1920.

Application filed December 16, 1919. Serial No. 345,390.

*To all whom it may concern:*

Be it known that I, WILLIAM E. COTTREL, a citizen of the United States, residing at Pemberton, in the county of Shelby and State of Ohio, have invented certain new and useful Improvements in Hog-Feeders, of which the following is a specification.

This invention relates to new and useful improvements in animal feeders in which the feed is controlled by the animal desiring food, and the primary object of the invention is to provide agitators operable by the animal whereby the feed is maintained in a live condition.

A still further object of the invention is to provide a device of the above nature including animal controlled feeding doors which will automatically close when the animal has obtained sufficient food and consequently will maintain the troughs of the feeder in a highly sanitary condition.

Another important object of the invention is to provide a device including means whereby the animal desiring food from the feeder is first compelled to agitate the feed before obtaining the same.

Another important object of the invention is to provide a device including a housing for containing feed, the construction of the housing being such as to provide feeding troughs which are sheltered from inclement weather.

Another object of the invention is to provide a device which is strong, durable, comparatively inexpensive to manufacture for the results obtained therefrom and which is highly efficient in practice.

Other objects and advantages of the invention will become apparent during the course of the following description.

In the drawings forming a part of the description, and wherein like numerals are employed to designate like parts throughout the several views:—

Figure 1:
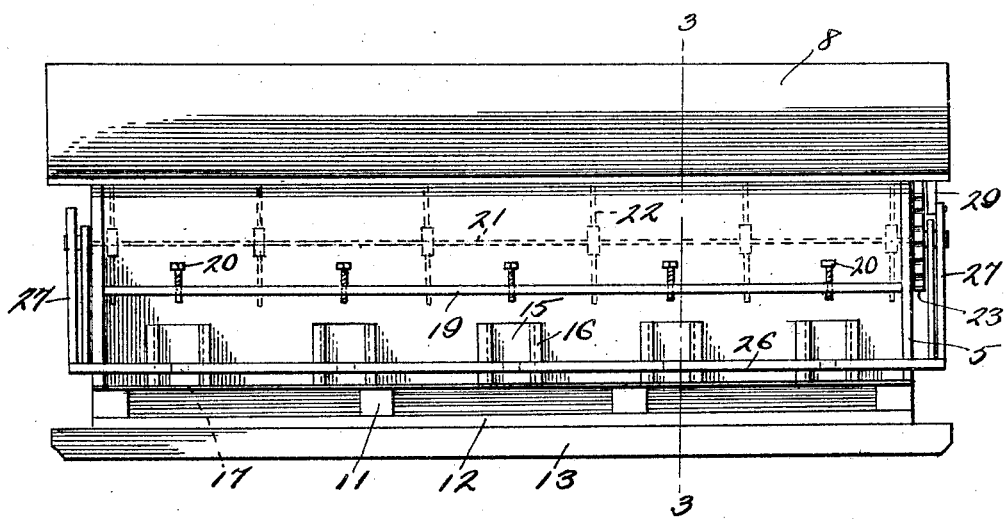
Figure 1 is a side elevation of the invention.
Figure 2:
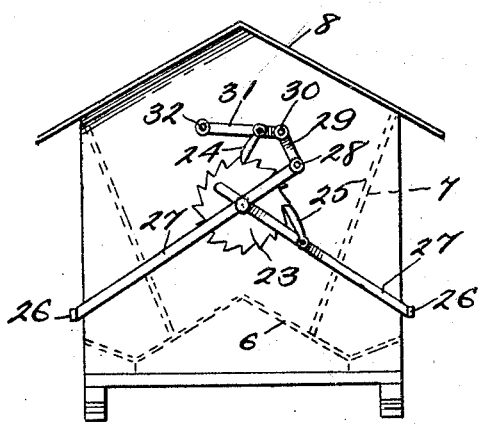
Fig. 2 is an end elevation of the same.

In the drawings, wherein for the purpose of illustration is shown a preferred embodiment of the invention, the numeral 4 designates the feeder housing in its entirety, which consists of ends 5, a bottom 6, inwardly inclined sides 7 meeting the bottom 6 and a roof 8 which extends a substantial distance beyond the sides and ends of the trough for a purpose which will be hereinafter set forth.

Figure 3:
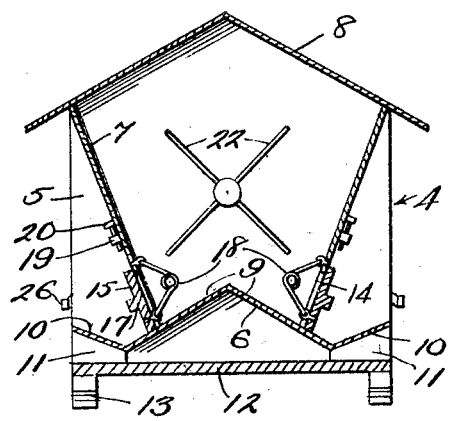
Fig. 3 is a transverse section taken on the line 3—3 of Fig. 1.

The bottom 6 is inclined downwardly and outwardly of the sides of the feeder from the longitudinal center thereof, as more clearly shown in Fig. 3. These downwardly inclined portions 9 of the bottom, upon which rest the sides 7, extend a substantial distance outwardly and beyond the sides 7 from where they incline upwardly and outwardly of the feeder as at 10 to provide a pair of longitudinally extending troughs. The bottom 6 is supported by spaced blocks 11 being interposed between the portions 10 of the bottom of the base 12. Runners 13 are secured to the base 12 and extend longitudinally thereof whereby the feeder may be moved to any desired location.

Each side 7 of the feeder is equipped with a plurality of spaced openings 14 which extend down to the portions 9 of the bottom 6. These openings are normally maintained closed through the medium of vertically movable animal controlled doors 15, which are slidably mounted in guides 16, a pair being provided for each door to engage the longitudinal edges of each door. In order that an animal may actuate the doors to obtain feed from the interior of the housing, a nose block 17 is secured to the outer face of each door, as more clearly shown in Fig. 3. Each door has associated therewith an inwardly extending spring 18, which is coiled intermediate its ends to provide a pair of outwardly diverging spring arms, the lowermost being secured to the door through the medium of an eye bolt or any other suitable means while the upper arm is secured by its free end in a like manner to the side of the housing, as most clearly shown in Fig. 3. These springs extend inwardly of the housing into the feed contained therein and when the feed doors 15 are raised the springs travel upwardly through the feed to agitate the same. After the animal is through feeding, the doors 15 will close under the tension of the springs and absolutely cut off the flow of feed into the trough.

As the various feeds vary in size, and it being necessary to restrict the movement of the doors 15 at times, a longitudinally extending beam 19 is secured to each side 7 of the feeder, a substantial distance above the doors 15. A plurality of screws, bolts 20 or the like are threadedly associated with the beam 19 to abut with the upper edges of the doors when the bolts 20 are so positioned.

The means for agitating the feed within the housing, consists of a shaft 21 which extends longitudinally through the housing and has its extremities extended beyond the ends of the housing, a plurality of radiating blades 22 being secured to the shaft at intervals therealong. A ratchet wheel 23 is secured to one extended end of the shaft 21 to coöperate with a pair of pawls 24 and 25 which will be presently described in detail. To actuate the pawls and impart rotary movement to the shaft 21, a longitudinally extending bar 26 is arranged upon each side of the feeder in spaced relation thereto and slightly above the outer edge of its respective trough. Levers 27 are secured to the ends of the bars 26 and are journaled adjacent their upper ends upon the shaft 21. One of these levers 27 is equipped with the pawl 25 whereby this pawl engages with one side of the ratchet wheel 23. The end of the outer lever 27 which is journaled to the shaft 21 extends a substantial distance beyond the ratchet wheel and is pivotally connected as at 28 to a link 29 which extends upwardly toward the center of the housing. This link is pivotally connected as at 30 to an arm 31 pivotally connected to the housing as at 32 whereby the arm 31 is normally disposed in approximately a horizontal plane above the ratchet wheel whereby the pawl 24 carried by the arm 31 normally engages the relative top of the ratchet wheel. It is to be noted that the bars 26 are disposed in front of the nose blocks 17 whereby the animal desiring food is compelled to first raise the bar 26 before he can gain access to the trough or to the nose block 17.

Each feeder is particularly adapted as a feeder for hogs or the like, as it is necessary for the animal desiring food to "root" in hog fashion to operate the agitator and the doors 15 which control the discharge of feed from the housing into the troughs. An animal desirous of obtaining feed, approaches the housing from either side, and due to the arrangement of the bars 26, must lift or raise the same before it is possible to project its head into either trough. As either bar 26 is raised, its respective pawl will engage the ratchet wheel 23 and impart rotary movement to the shaft 21 and agitator blades 22 thereby causing the agitator to thoroughly stir the feed within the housing. Having obtained access to either trough, the animal must engage the nose block 17 of one door with his nose and "root" at the same time to raise the doors 15 which will permit feed from the housing to slide down the inclined portions 9 and thence into the trough. Each door 15 carries an agitator spring 18 and consequently when an animal "roots" at he door, the spring will be caused to pass through the feed to loosen or agitate the same whereby the feed within the housing is maintained in a live condition. After the animal has obtained sufficient food and stops rooting at the doors 15, they will automatically close, after which he withdraws his head from the trough and under the bar 26 to permit the same to assume its normal position. Consequently it will be seen that animals not knowing how to root or operate the feeding mechanism, will not be able to obtain food therefrom and accordingly poultry or the like will be prevented from using the feeder and consequently, the troughs will remain in a sanitary condition.

The foregoing description and accompanying drawings have reference to what might be considered to be the approved or preferred form of my invention. I desire it to be understood that I may make such changes in the construction, combination and arrangement of parts, materials, dimensions, et cetera, as may prove expedient and fall within the scope of the appended claims.

Having thus fully described my invention what I claim as new and desire to secure by Letters Patent, is:

1. A feeder comprising a housing, an animal controlled sliding feed door carried thereby, and spring means connected to said door for agitating the feed in said housing and automatically closing said door.

2. A feeder comprising a housing, an animal controlled sliding feed door, an inwardly extending spring for said door having its intermediate portion coiled, one arm of the spring being connected to said door, and the other arm being connected with the housing, whereby said spring agitates the feed within the housing and automatically closes said door.

3. A feeder comprising a housing, a feed trough, an animal controlled feed door, an animal controlled agitator within said housing, and means for operating the agitator prior to the operation of the feed door, including a bar arranged above the trough and in front of said animal controlled feed door.

4. A feeder comprising a housing, a trough carried thereby, a shaft extending through said housing, agitator blades on said shaft, a ratchet wheel on said shaft, levers journaled on said shaft, a bar secured to each lever and arranged in front of said trough, and a pawl actuated by each lever and engageable with said ratchet wheel for imparting rotary movement to said shaft when either bar is moved.

5. A feeder comprising a housing, a trough, a plurality of animal controlled vertically slidable doors normally engaging the bottom of said trough, a bar secured to said housing, and a plurality of bolts threaded through said bar and engageable with the upper edges of said doors for limiting their vertical movement.

6. A feeder comprising a housing, a rotatable animal controlled agitator in said housing, a member arranged above the trough and adapted to be raised by the animal to permit access to the trough, and a lever secured to said member and associated with the agitator to impart rotary movement to the agitator when said member is raised.

In testimony whereof I affix my signature in presence of two witnesses.

WILLIAM E. COTTREL.

Witnesses:
RUFO H. MELHORN,
L. G. SHANELY.